H. H. YOUNG.
DOUGH RAISING APPARATUS.
APPLICATION FILED MAR. 13, 1908.

915,010.

Patented Mar. 9, 1909.
2 SHEETS—SHEET 1.

WITNESSES.

INVENTOR.
Hermann H. Young
by Wm. F. Booth
his Attorney

H. H. YOUNG.
DOUGH RAISING APPARATUS.
APPLICATION FILED MAR. 13, 1908.

915,010.

Patented Mar. 9, 1909.
2 SHEETS—SHEET 2.

WITNESSES.

INVENTOR.
Hermann H. Young
by Wm. F. Booth
his Attorney

UNITED STATES PATENT OFFICE.

HERMANN H. YOUNG, OF SAN FRANCISCO, CALIFORNIA.

DOUGH-RAISING APPARATUS.

No. 915,010.  Specification of Letters Patent.  Patented March 9, 1909.

Application filed March 13, 1908. Serial No. 420,968.

*To all whom it may concern:*

Be it known that I, HERMANN H. YOUNG, a citizen of the United States, residing in the city and county of San Francisco and State of California, have invented certain new and useful Improvements in Dough-Raising Apparatus, of which the following is a specification.

My invention relates to bakery apparatus, in general, and, particularly, to a means for mechanically handling and disposing of the divided and rounded dough-lumps, during a brief "raising" interval, prior to molding them into loaves ready for the ovens. After the dough is divided into lumps of given weight, and the lumps are "rounded", to smooth out and heal, as it were, the surface cut and rounded by the divider, so that it can properly confine the gases of fermentation and effect the "raising", an interval, more or less brief should be allowed before molding, to permit the necessary fermentation to take place. If this be done, as would be most natural, by simply placing the rounded lumps upon tables, and allowing them to remain there any given length of time, there would result several disadvantages, such as the taking up of a large, available and otherwise useful space in the bakery, the handling of the material with the consequent danger of contamination, and the cost of labor to do the work.

To obviate these disadvantages, as well as to effect direct beneficial results, such as a more even temperature, freedom from drafts, and a control of the time of the raising interval, are the objects of my invention; and to these ends my invention consists in the novel self-handling or automatic dough-raising apparatus which I shall now fully describe by reference to the accompanying drawings in which—

Figure 1:
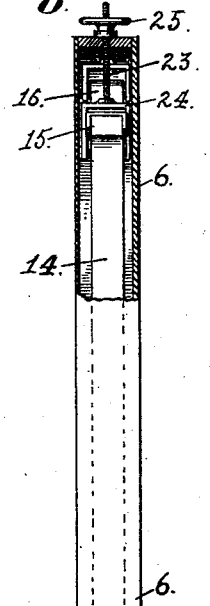
Figure 2:
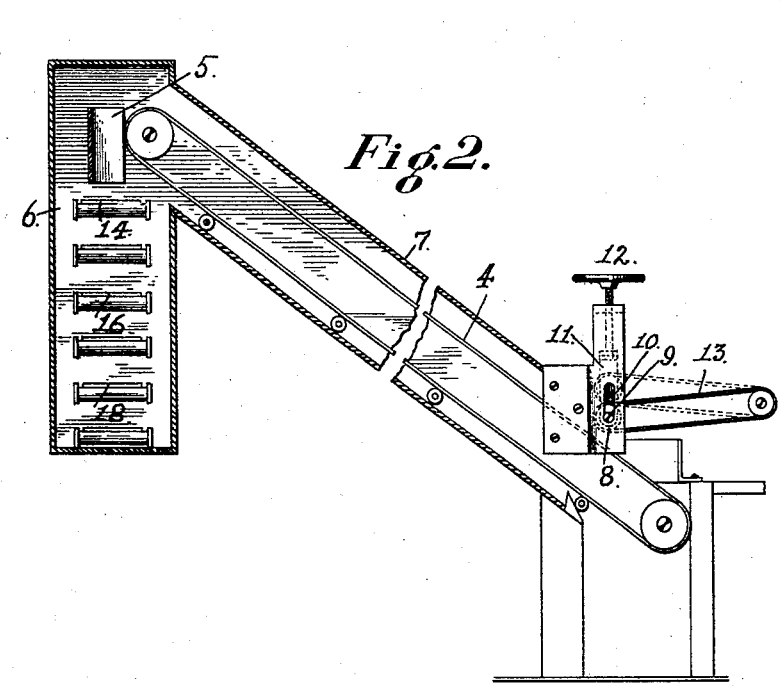
Figure 2:
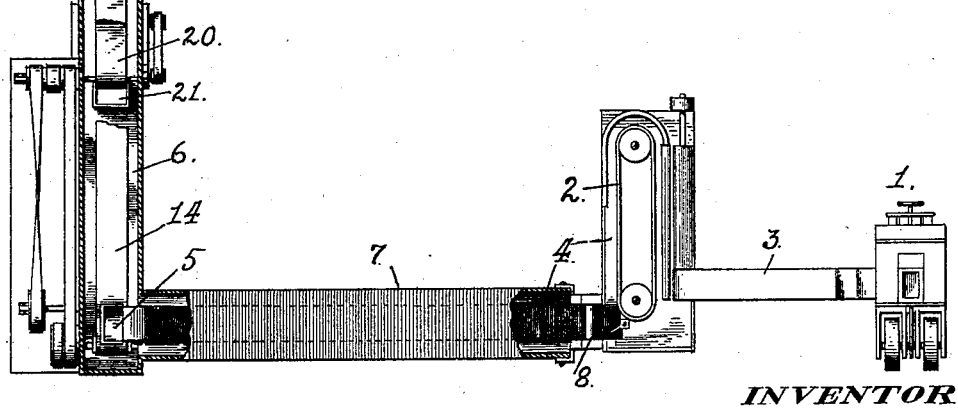
Figure 3:
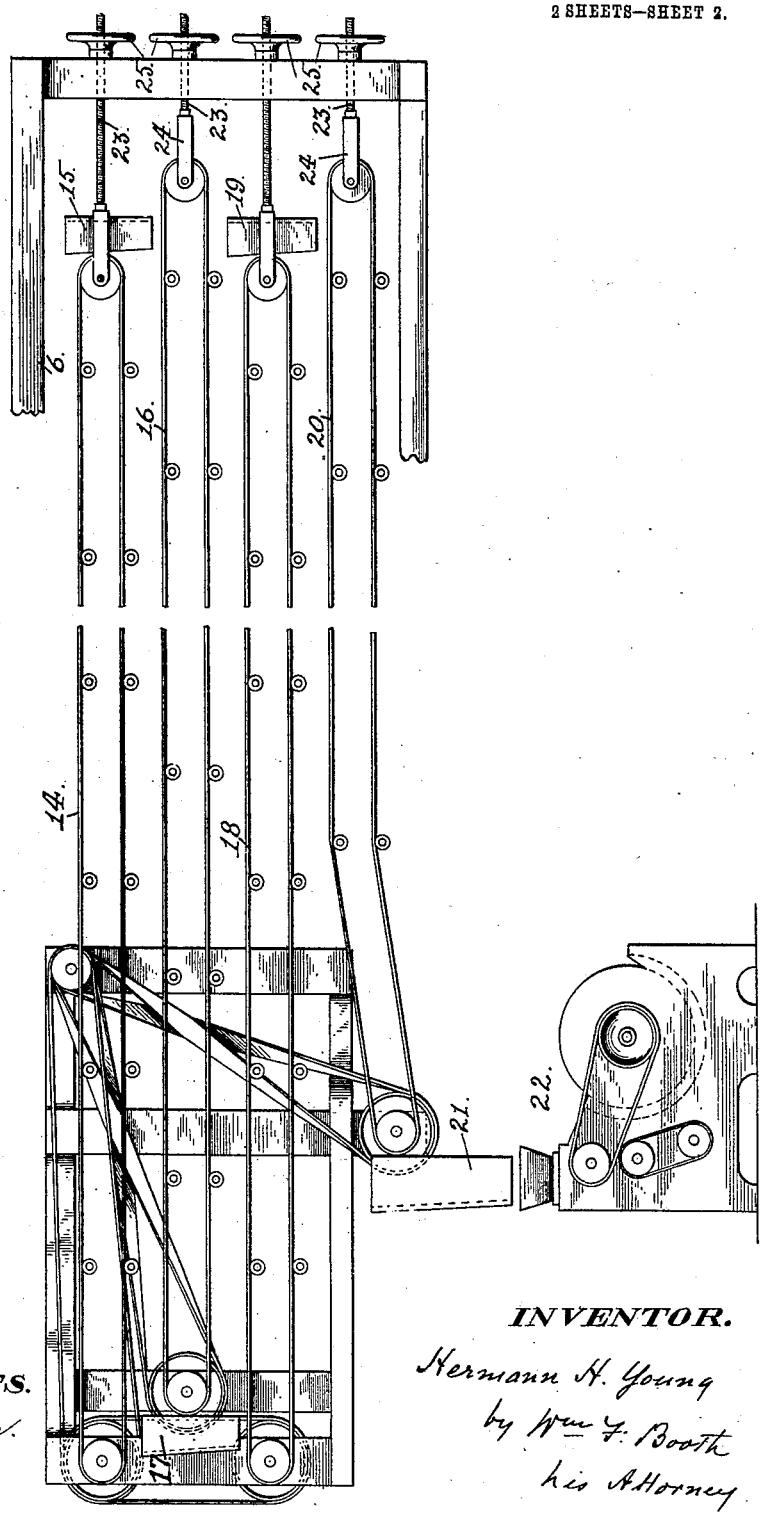

Figure 1 is a plan, partly broken, of my apparatus. Fig. 2 is an enlarged sectional view at the entrance end of the apparatus. Fig. 3 is an enlarged side view, broken, of the raising chamber, showing its relation to the molding machine.

1 indicates, somewhat diagrammatically, a dough-divider or weigher, and, similarly, 2 indicates a rounding machine, both being common in the art, and, therefore, requiring no detailed description.

3 is a short, traveling belt by which the divided lumps of dough are conveyed from the divider 1 to the rounder 2.

From the delivery terminal of the rounder extends an endless, traveling belt 4 which leads upwardly at an angle to a receiving hopper 5 in the upper part of the "raising" chamber 6. The belt 4 is inclosed by a suitable casing 7 which joins the chamber 6.

The dough lumps, when delivered by the rounder 2 to the initial belt 4, at once meet with a presser roll 8 under which they pass, with the effect of sufficiently flattening their under sides, to prevent them from rolling on the inclined belt, and to enable them to cling thereto and to be carried up the incline. This presser roll 8 is an adjustable one, in order to properly set it with relation to the dough-lumps and with regard to their size; thus, for one pound lumps, the roll 8 will be set lower down, while if two pound lumps are being passed through, it will be raised. For this adjustment the spindle 9 of the roll 8 is mounted in a slot 10, Fig. 2, in its frame, and is carried by a yoke 11 which is raised or lowered by a hand-screw 12. The presser roll is driven by a belt 13.

In the raising chamber 6 is a vertical series of horizontal, endless, traveling carriers, in any suitable number, four being here shown. The uppermost carrier 14 is arranged to receive the dough-lumps directly from the hopper 5 to which the lumps are delivered by the inclined initial belt 4; and said upper carrier thence conveys them from the hopper throughout a long horizontal path to a hopper 15 at the end of said path, through which they fall upon the next carrier 16. By this carrier they are conveyed on a return path to a hopper 17, through which they fall to the third carrier 18. On this carrier they are moved forward again to a hopper 19 through which they pass to the fourth carrier 20, by which they are conveyed back once more to a discharge hopper 21. By this hopper they are delivered to a molding machine, indicated by 22. The several carriers are driven, in their respective courses, by driving belts and pulleys, suitably arranged, as indicated, and which need no detailed description; and said carriers are kept under proper horizontal tension, by the screws 23 connected by stirrups 24 with the terminal drums of said carriers, and operated by hand-nuts 25, as shown clearly in Fig. 3.

The temperature in the raising chamber may be kept properly, and under suitable control, and means may be provided to permit inspection of the interior of the chamber.

It will now be seen that by my invention, the formed and rounded dough-lumps are delivered mechanically to the raising chamber, and are not touched by the operators. This, from a sanitary standpoint is most desirable. It will also be seen that during the interval of raising, the dough is out of the way, instead of being spread around on tables and occupying otherwise available room in the bakery. While thus disposed of in the raising chamber, the dough is subjected to its proper period of fermentation, under the most advantageous conditions of temperature, time of seclusion and protection; and a material saving of labor is effected, as the whole operation is automatic, as it were.

Having thus described my invention, what I claim as new and desire to secure by Letters Patent is:—

An apparatus for mechanically performing a continuous sequential series of operations or treatments for the purpose set forth, comprising dough lump forming and rounding mechanisms, loaf molding mechanism, and an intermediate raising chamber comprising an incased traveling carrier, all associated and connected for joint operation, means for conveying the rounded dough lumps from the rounder to said carrier, and means for delivering the raised lumps from said carrier to the loaf molding mechanism.

In testimony whereof I have signed my name to this specification in the presence of two subscribing witnesses.

HERMANN H. YOUNG.

Witnesses:
   WM. F. BOOTH,
   D. B. RICHARDS.